United States Patent
Gombert et al.

(10) Patent No.: US 10,579,045 B2
(45) Date of Patent: Mar. 3, 2020

(54) ROBOT CONTROL

(71) Applicant: ABB GOMTEC GMBH, Seefeld (DE)

(72) Inventors: Bernd Gombert, Wöthsee (DE); Felix Schreiber, München (DE)

(73) Assignee: ABB gomtec GmbH, Gilching (DE)

( * ) Notice: Subject to any disclaimer, the term of this patent is extended or adjusted under 35 U.S.C. 154(b) by 220 days.

(21) Appl. No.: 15/115,427

(22) PCT Filed: Jan. 28, 2015

(86) PCT No.: PCT/EP2015/000154
§ 371 (c)(1),
(2) Date: Jul. 29, 2016

(87) PCT Pub. No.: WO2015/113757
PCT Pub. Date: Aug. 6, 2015

(65) Prior Publication Data
US 2017/0160721 A1   Jun. 8, 2017

(30) Foreign Application Priority Data
Jan. 31, 2014 (DE) .......... 10 2014 001 168

(51) Int. Cl.
*B25J 9/16* (2006.01)
*G05B 19/409* (2006.01)
*B25J 13/02* (2006.01)

(52) U.S. Cl.
CPC .......... *G05B 19/409* (2013.01); *B25J 9/1656* (2013.01); *B25J 13/025* (2013.01); *G05B 2219/36433* (2013.01); *G05B 2219/37396* (2013.01); *G05B 2219/39439* (2013.01); *G05B 2219/45118* (2013.01)

(58) Field of Classification Search
CPC ........ G05B 19/409; G05B 2219/36433; G05B 2219/37396; G05B 2219/39439; G05B 2219/45118; B25J 13/025; B25J 9/1656
USPC ......................................................... 700/254
See application file for complete search history.

(56) References Cited

U.S. PATENT DOCUMENTS

| | | | |
|---|---|---|---|
| 6,049,756 A * | 4/2000 | Libby | G06T 19/003 318/587 |
| 6,212,443 B1 | 4/2001 | Nagata et al. | |
| 2009/0076652 A1* | 3/2009 | Wieland | G05B 19/19 700/250 |
| 2013/0307850 A1* | 11/2013 | Mukai | G06T 13/40 345/420 |
| 2014/0257329 A1* | 9/2014 | Jang | A61B 34/30 606/130 |

FOREIGN PATENT DOCUMENTS

| | | |
|---|---|---|
| DE | 102008062622 | 6/2010 |
| EP | 2131257 | 12/2009 |
| WO | WO 2011153569 | 12/2011 |
| WO | WO 2013033747 | 3/2013 |

OTHER PUBLICATIONS

International Search Report and Written Opinion PCT Application PCT/EP2015/000154, EPO, dated Jun. 1, 2015.

* cited by examiner

*Primary Examiner* — Stephen Holwerda

(57) ABSTRACT

A manual robot control by which a reference point of the robot is moved continually in space or positioned on an adjacent snap point depending on the control input.

16 Claims, 3 Drawing Sheets

ROBOT CONTROL

The invention lies within the field of robot control. Robots can be designed in an extremely wide variety of forms. One widely used form is the articulated arm robot. In this form the robot is built up out of arm elements which are connected together in an articulated manner. An instrument or a tool with which particular tasks can be carried out is typically attached to the last arm element of the robot.

Such robots can be controlled autonomously or manually. In the case of manual control, a control unit of the robot is connected with a control element which registers the manual inputs of an operator and controls the robot according to the input. In this way it is for example possible for an operator to move a robot from one position to another position and also operate the instrument.

Manual control of a robot involves certain difficulties in terms of precision, since this depends on the manual dexterity of the operator. However, the positioning of the robot to a precise point or the guidance of the robot precisely on or along a movement path can also be made more difficult in that, in order to hold the robot at a particular point or in order to control a slow movement of the robot, it can be necessary to keep its motors in permanent excitation, so generating vibrations in the robot which prevent the operator from precisely judging the position of the robot.

It is therefore the object of the invention to provide a method and means for the manual control of a robot which make possible the simple and precise actuation of the robot, in particular exact positioning at a particular point as well as the guidance of the robot on or along a movement path.

The problem addressed by the invention is solved by means of a method for controlling a robot comprising the steps:
a) definition of at least one snap point within a working space comprising location points which can be reached by a reference point of the robot,
b) detection of the magnitude of an actuation of a control element,
c) movement of the reference point to a snap point adjacent the current location point, if the magnitude of the actuation lies below a switchover threshold, and
d) continuous movement of the reference point, if the magnitude of the actuation lies above the switchover threshold.

The problem is also solved by means of a robot system with a robot and a control unit for controlling movements of the robot according to this method, as well as by means of a computer program product which includes instructions which, when run on a computer, enable said computer to carry out the method.

The reference point can be any point on the robot. Typically, the so-called "tool centre point", which can for example be located at the tip of a tool, is defined as the reference point. To simplify matters, the position of this reference point can be equated with the position of the robot, and the control unit influences this position according to a detected actuation of the control element.

The control element can be any type of input device suitable for controlling a robot. The control element can be permanently installed on the robot or can be detached from the robot. Popular construction forms include joysticks, 3D mice or pressure sensors. Control by means of a touchpad is also possible. In this case, the user's fingers, detected by the touchpad, can be interpreted as a "control element".

The magnitude of the actuation, for example the deflection of a joystick or the amount of an actuating force, is evaluated, whereby it is determined whether a particular freely definable switchover threshold is exceeded. If this is the case, the robot, or the reference point, can be moved continuously, in particular at substantially constant speed and/or on a path free from abrupt changes in direction. In this way, extensive movements can be controlled quickly and efficiently, and the reference point follows the user input exactly.

If, in contrast, the magnitude of the actuation lies below the switchover threshold, then—irrespective of the precise magnitude of the actuation—the reference point is positioned exactly on the adjacent snap point. In this way, the movement of the robot can in particular be controlled precisely over short distances, irrespective of how precisely or steadily the user is able to guide the control element.

If the magnitude of the actuation lies below a switchover threshold, then on reaching the snap point the movement is, advantageously, halted at least temporarily in order to signal to the user that the snap point has been reached. If the control element is movable together with the robot, such an interruption can result from a movement of the control element away from the user's finger which is actuating it having led to a discontinuation of the actuation, so that the control element is no longer actuated. However, in particular if the control element is not movable together with the robot, such an interruption can also take place with uninterrupted actuation of the control element. If this snap point corresponds to the desired position, the user simply needs to refrain from further actuation.

In a further development of the invention, the movement of the reference point to a snap point in the event of an actuation below a switchover threshold and the continuous movement of the reference point in the event of an actuation above the switchover threshold are only carried out if the magnitude of the actuation lies above a reaction threshold. In this way, a minimum degree of actuation is necessary in order for the robot to be set in motion. Otherwise the robot remains at its current location point.

Advantageously, in order to detect the magnitude of the actuation of the control element, a vectorial value is measured and the amount of the vector is assumed to be the magnitude of the actuation.

The reference point is advantageously moved in a spatial direction assigned to the direction of the detected vector. This direction can be identical to that of the vector, if the control element is attached to the robot and can be moved together with this. If the control element cannot be moved together with the robot, the direction of the vector can be converted into the direction of movement of the robot, for example by means of a linear transformation.

The vectorial value can correspond to a deflection of the control element from an idle position or to a force exerted on the control element.

Advantageously, the reference point is moved more quickly the greater the magnitude of the actuation is, i.e. the speed of the reference point can be varied depending on the deflection of the control element or the force exerted on the control element.

According to a further development of the invention, as soon as an actuation ends and the reference point is not located on a snap point, the reference point is automatically moved to a snap point. This does not require any further manual actuation of the control element. Because points which might be possible targets for the movement of the robot can be defined as snap points, these can be approached quickly and precisely even over long distances.

The end of an actuation of the control element can be detected if the magnitude of the actuation falls below the switchover threshold and/or the reaction threshold. No further manual input is required for this either.

According to the invention, those points which have particular characteristics are defined as snap points. For example, the snap points can lie on a periodic lattice.

A possible location point of the robot at which the robot is intended to perform or has already performed an activity can be defined as a snap point. The invention thus supports a user in performing the activity repeatedly in that the exact positioning on the snap point is not left to the user; instead, the robot can return automatically to this snap point.

Also, the movement of the reference point triggered through an actuation of the control element can be recorded.

Points passed through during such a movement can be defined as snap points which can be traced later. For example, a new snap point can be set automatically at each point at which a change in the direction of movement of the control element takes place. Once performed, the movement of the reference point along the snap points defined in this way can then be reproduced.

In the case of the aforementioned step c), the movement to the adjacent snap point advantageously takes place in a straight line.

The arrangement of the snap points can fundamentally take any form and can for example be based on constraints of the specific working space in which the robot is being used. According to an advantageous embodiment of the invention, in at least one part of the working space a periodic lattice of cells is defined, each of which contains an identical arrangement of one or more snap points, advantageously in the corners of the cell.

The periodic lattice can be any Bravais lattice, such as is known from the field of crystallography. The periodicity of the lattice means that a movement which has led from one snap point of a first lattice cell to a homologous snap point of an adjacent cell can be repeated identically in order to reach a snap point of a further cell again. This makes it possible, if the actuation of the control element does not exceed the switchover threshold, for the user to steer the reference point from snap point to snap point along a straight path, even if the actuation of the control element deviates slightly from an exactly straight path. Slight inaccuracies in control on the part of the user do not affect the linear movement of the reference point.

In step c) of the method, the search for the adjacent snap point can be limited to a spatial region centred around the current location point. This is in particular practical if a continuous movement of the robot has taken place previously.

Alternatively, the adjacent snap point can be sought in a spatial region on the edge of which the current location point is located. In this way, a preferred direction can be specified in which the robot moves from the location point to the snap point.

In particular, the spatial region can extend beyond the current location point in the direction of an immediately preceding movement, so that the movement of the robot from the location point to the snap point continues the preceding movement roughly in a straight line.

If the spatial region does not contain a snap point, a further movement of the reference point may not take place.

Further features and advantages of the invention are explained in the following description of exemplary embodiments with reference to the enclosed figures, in which.

Figure 3:
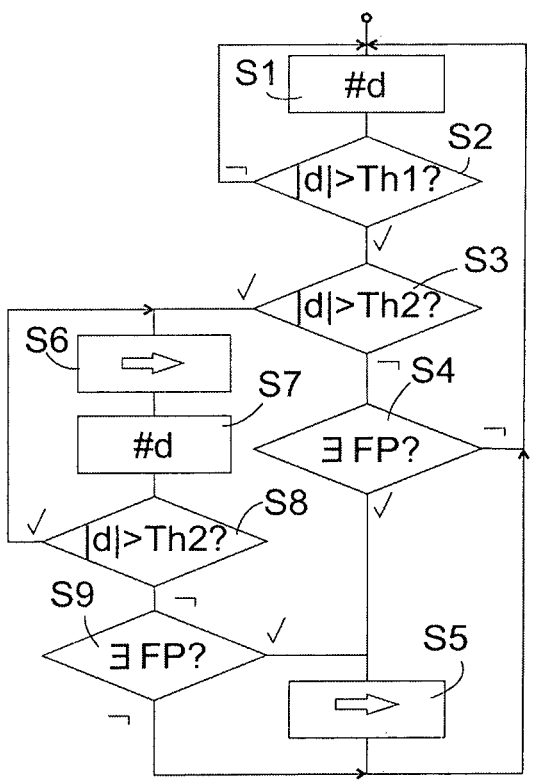
Figure 4:
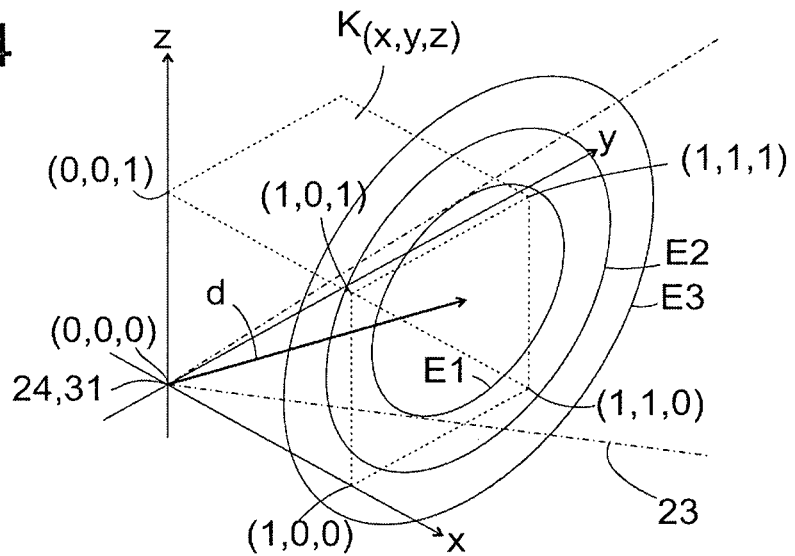
Figure 5:
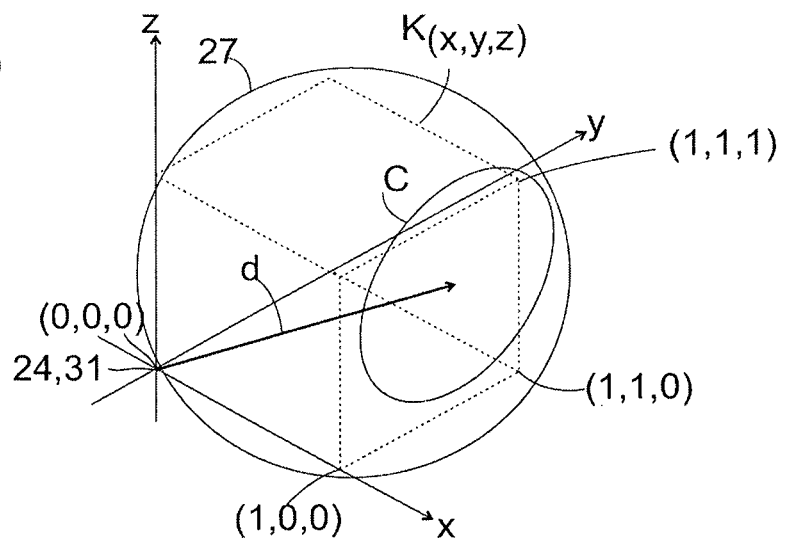
Figure 6:
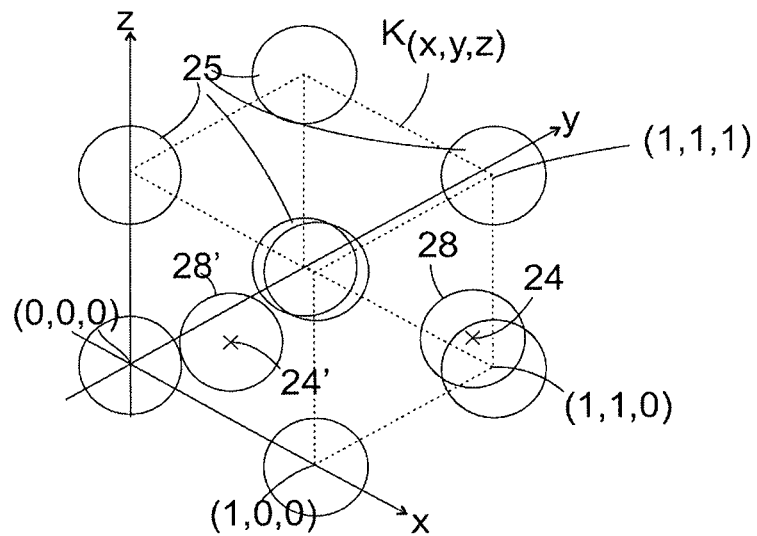
Figure 7:
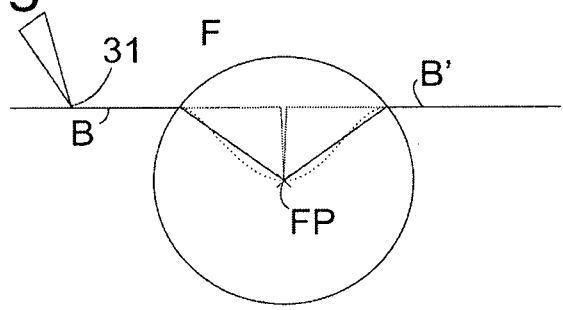

FIG. 3 shows a flow chart of a working method carried out by a control unit of the robot system, FIG. 4 shows snap points and an actuation vector in the working space of the robot system according to a first variant of the method, FIG. 5 shows snap points and an actuation vector according to a second variant of the method FIG. 6 shows snap points and snap spaces according to a third variant of the method, FIG. 7 shows a path of the robot when passing through a snap space according to a further variant.

Figure 1:
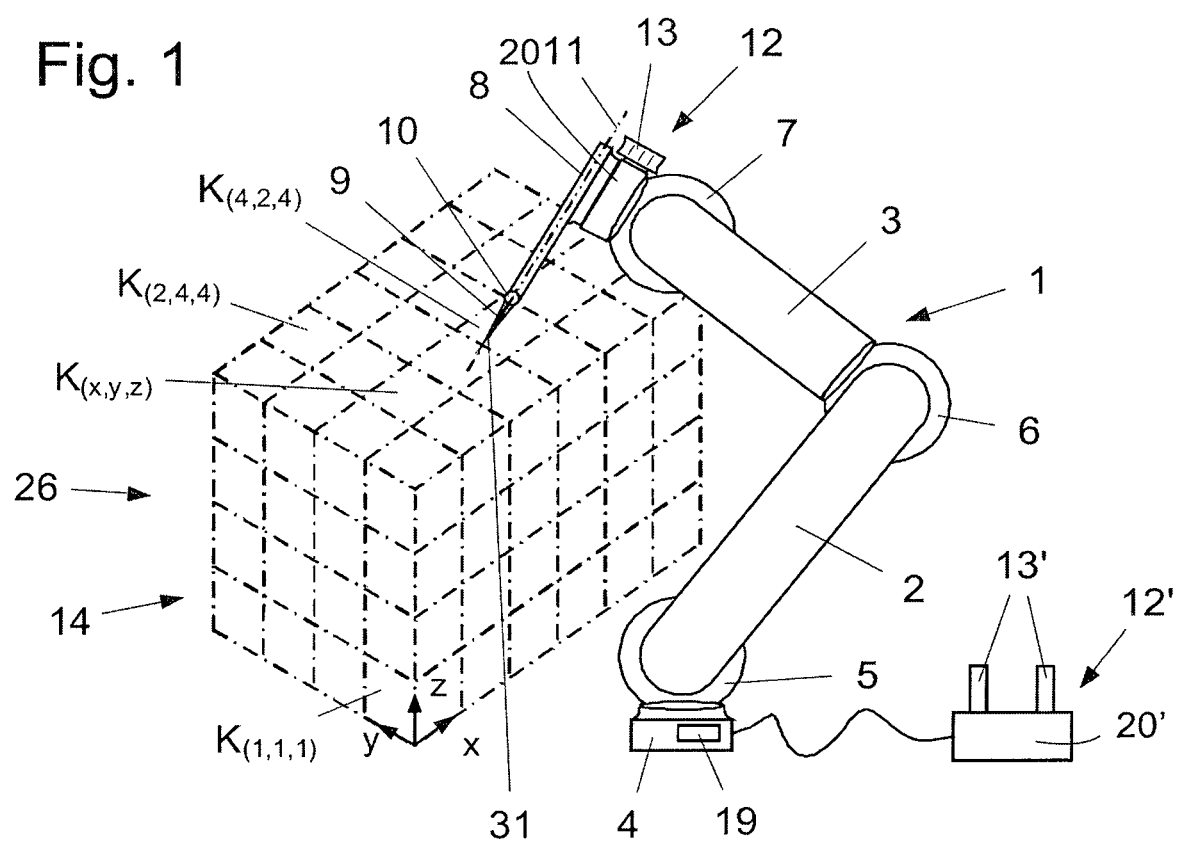
FIG. 1 shows a robot system.

FIG. 1 shows an electric-motor-driven robot 1. The robot 1 comprises of arm elements 2, 3, a base element 4, articulated joints 5, 6, 7 which can be driven by electric motors, and an instrument 8. The arm elements 2, 3 and the instrument 8 can be moved by means of the articulated joints 5, 6 and 7. The instrument 8 has an end effector 9 which is connected movably with the instrument 8 via an articulated joint 10. Depending on the intended use, an instrument 8 can be equipped with different end effectors 9, for example a camera, a scalpel, scissors, a needle, a scraper, a file, a gripper, etc. A preferred point, for example at the tip of the end effector 9, serves as the reference point 31, which defines the position of the robot 1.

In order to detect user inputs, a control unit 19 of the robot 1 is connected with a manually operable input device. FIG. 1 shows two variants. A first input device 12' is connected to the robot 1 as an external device. It comprises a base 20' which is fixed in position and at least one control element, in this case two control elements 13' mounted on the base which can be swivelled in one or two degrees of freedom. A second input device 12 has a base 20 integrated directly in the robot 1, for example between the instrument 8 and the articulated joint 7, and a control element 13 which is movable in three spatial directions relative to the base 20 and/or can be swivelled around several axes. Such a control element 13 should have an idle position relative to the base to which it returns automatically when not operated, for example under the influence of a return spring. In this way it is ensured that if a user accidentally or intentionally loses contact with the control element 13 the control unit 19 can detect that the control element 13 is no longer being operated and can halt the movement of the robot 1. Alternatively, the control element 13 can also be immovable relative to the base 20, but coupled to it via sensors which are sensitive to force and/or torque; such a control element is also detected as not being operated as soon as a user releases it. Both input devices 12, 12' or only one can be provided.

Stored in the control unit 19 is a description of a working space 14 in which the robot 1 can move. This working space 14 can correspond to the physical range of the robot 1; however, spatial regions which lie within the physical range can also be excluded from the working space 14, for example in view of safety considerations. Typically, the robot 1 is permitted to penetrate into the working space 14, but not to leave it.

According to the invention, the robot 1 can be positioned exactly at predefined points, referred to in the following as snap points. Any location points of the robot 1 within the working space 14 can be selected as snap points and defined in the control unit 19.

However, according to an advantageous embodiment of the invention, the working space 14 is divided into numerous cells of identical form, in this case of cuboid form, in particular cubes $K_{(x,y,z)}$, and the corners of each of these cells are defined as snap points. A lattice 26 resulting from this division is shown in FIG. 1. Axes x, y, z of the lattice 26 run in the direction of the edges of the cells $K_{(x,y,z)}$.

Generally, the position of a cell $K_{(x,y,z)}$ can be stated by means of its indices x, y, z, each index x, y, z corresponding to the position in the relevant direction x, y, z of the coordinate system. Accordingly, the cell lying directly on the coordinate origin is designated $K_{(1,1,1)}$ since, starting from the coordinate origin, it stands in first place in relation to the three directions x, y and z. Likewise, $K_{(2,4,4)}$ designates the cell which, starting out from the coordinate origin, is positioned in second place in the x-direction, in fourth place in the y-direction and in fourth place in the z-direction.

In terms of applications within the wafer and semiconductor industry it can be practical to choose a fraction of an inch (25.4 mm) as the length of the edges of the cells.

Figure 2:
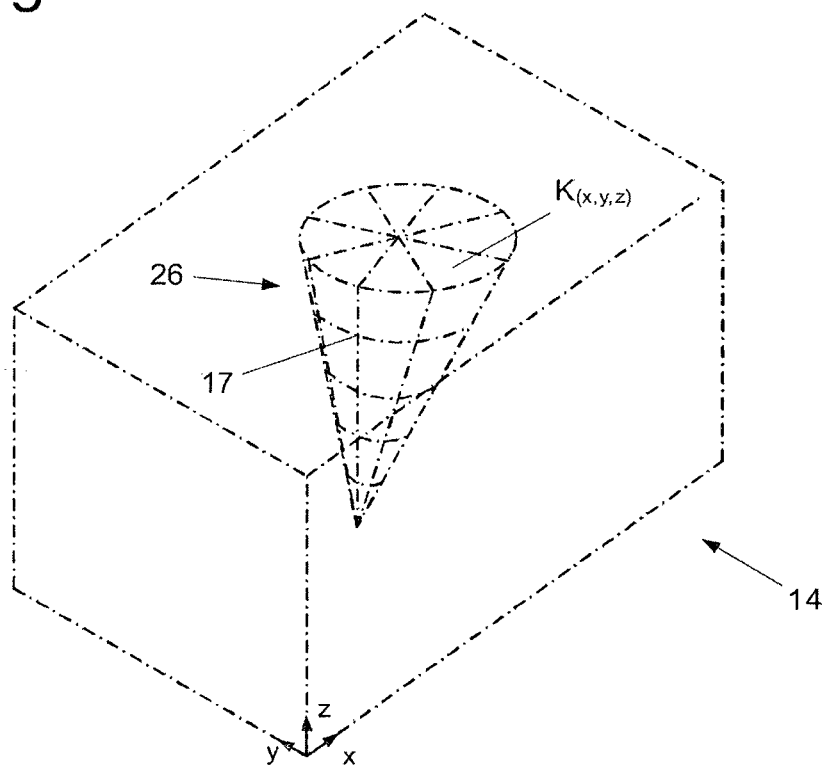
FIG. 2 shows a working space of the robot system.

It can be practical to define snap points in a part of the working space 14 only. In particular, parts of the working space 14 which do not contain any targets which are to be approached exactly by the robot 1 can remain free of snap points. Thus, FIG. 2 shows by way of example a working space 14 in which a lattice 26 of snap points 17 is defined in a conical partial region only. Unlike the cuboid lattice shown in FIG. 1, in this lattice the cells $K_{(x,y,z)}$ are not identical in form.

A working method of the control unit 19 is explained in the following with reference to FIG. 3. If the user actuates one of the input devices 12, 12', it supplies a signal representative of the magnitude of the actuation to the control unit 19 (step S1). The signal specifies, for example, the deflection d of the control element 13 or 13' relative to its base 20 or 20' or a force exerted on the control element, in each case in vectorial form, in Cartesian, polar or any other coordinates.

In step S2 the control unit 19 compares the amount |d| specified by the signal with a reaction threshold Th1. If this threshold is not reached, the processing ends; if it is exceeded, then in step S3 the amount is compared with a switchover threshold Th2.

If the magnitude of the actuation lies above the reaction threshold Th1, but below the switchover threshold Th2, in step S4 the control unit 19 determines a snap point which is adjacent the current location point of the reference point 31. If such a snap point exists, the control unit 19 moves the reference point 31 to this snap point in step S5.

Whether an adjacent snap point is always found in step S4 depends on which definition of an adjacent snap point is applied.

In step S4, the snap point which, of all the snap points, is the shortest distance from the current location point can be selected as the adjacent snap point. Such a snap point always exists; consequently, one can always be found in step S4.

The selection can also be limited to snap points within a partial region of the working space, for example a cone 23, the apex of which is the current location point 24 of the reference point 31 and which opens in the direction of the detected vector d. This case is illustrated in FIG. 4. Here, the current location point of the reference point 31 is itself a snap point of the lattice 26 and is assumed here to be the origin (0,0,0) of the coordinate system; the vector d intersects a rectangle defined by snap points (1,0,0), (1,1,0), (1,1,1) and (1,0,1). However, the selection method is also applicable if the location point 24 is not a snap point. The cone 23 within which the control unit 19 searches for adjacent snap points has as its apex the current location point 24 i.e. (0,0,0), and as its axis the vector d. Different snap points are obtained as the result of step S4 depending on the aperture angle of the cone 23. If the aperture angle is small, so that the lateral surface of the cone 23 intersects the plane x=1 of the snap points (1,0,0), (1,1,0), (1,1,1) and (1,0,1) along an ellipse E1, then (1,1,1) is the snap point selected in step S4, and in step S5 the reference point is moved through the cube defined by the location point and snap points along the spatial diagonal. If the aperture angle were even smaller, then the case could arise that an adjacent snap point can only be found at a greater distance, for example in the plane x=2 or x=3. With a medium aperture angle, if the lateral surface of the cone intersects the plane x=1 along an ellipse E2, then the snap points (1,0,1) and (1,1,0) also lie within the cone; one of these, ideally the one whose coordinates form the greater scalar product with the vector d, is selected in step S4, and in step S5 the reference point 31 is moved along a face diagonal of the cube.

In order to position the reference point 31 on the selected adjacent snap point, the control 19 generates corresponding control signals. These signals are sent to the corresponding articulated joints 5, 6, 7 and/or 10, so that the arm elements 2, 3 and/or the instrument 8 with its end effector 9 are set into a movement which results in the desired positioning of the reference point 31.

By selecting a sufficiently large aperture angle it can be ensured that, irrespective of the direction of the vector d, an edge of the cube always lies within the cone; then, in step S4 an adjacent snap point is always selected which can be reached by moving along an edge of the cube; for example, in the case of the cone intersecting the plane x=1 on the ellipse E3, the snap point (1,0,0).

If the snap points are not arranged regularly, in particular not on a periodic lattice, the method described above can under certain circumstances lead to an adjacent snap point being determined in a cell of the lattice 26 which is distant from the location point, and a slight actuation of the control element 13 or 13' results in an extensive movement of the robot 1. This can be prevented if the partial region of the working space examined in step S4 is finite in all three spatial directions. FIG. 5 illustrates the case in which this spatial region is a sphere 27, on the surface of which the current location point 24 or (0,0,0) lies and the surface of which is perpendicular to the vector d at the current location point (0,0,0). Here, the sphere 27 intersects the plane x=1 in a circle C. In the case shown in FIG. 5, the only snap point within the sphere 27 is the point (1,1,1); consequently, this point is selected in step S4 and the reference point 31 is moved to it in step S5.

The case can arise in which the sphere 27 does not contain any snap point, for example if the lattice of snap points is only defined in a part of the working space and the vector d points towards a part of the working space 14 which is free of snap points. In this case the method returns from step S4 directly back to S1, the robot remains unmoved. If the user nonetheless wishes to bring about a movement of the robot, he will intuitively actuate the control element 13 or 13' with greater force, so that on repeating the step S3 an exceeding of the switchover threshold Th2 is finally detected. A step S6, to which the method then branches off, will be described more precisely below.

After the reference point 31 has been moved to the selected snap point in step S5, the method returns to the starting point S1. If the input continues, for example because the user holds the control element 13, 13' in a constant deflection until the robot has travelled a desired distance, the steps described above are repeated periodically.

It can be the case that the robot stops briefly after each step S5. This makes it possible for a user to recognise the individual movement steps and if necessary count these off. The control element 13 which can be moved together with the robot 1 is particularly suitable for controlling such a stepwise movement: if the user taps it in a desired direction of movement, the robot moves a step towards an adjacent snap point in this direction; as a result, the control element 13 also moves away from the user's hand, and the actuation ends through the movement of the robot, as long as the user does not move his hand along with the control element 13.

If, on the other hand, an exceeding of the switchover threshold is detected in step S3, then in step S6 the control unit 19 initiates a continuous movement of the reference point 31 in the direction designated by the direction of the vector d detected in step S1. For this purpose, the control 19 again generates corresponding signals which are sent to the corresponding articulated joints 5, 6, 7 and/or 10, so that the arm elements 2, 3 and/or the instrument 8 with its end effector 9 are set in corresponding motion.

During the course of this movement, the input is detected again in step S7. In step S8, the amount of the detected vector d is once again compared with the switchover threshold Th2 (or, alternatively, with the reaction threshold Th1). If it is exceeded, then the target of the movement has clearly not yet been reached, and the method returns to step S6 in order to continue the movement according to the updated vector d. If the threshold is not reached, it is to be assumed that the robot has reached, or at least virtually reached, the target desired by the user. In this case the movement of the robot can be terminated immediately; advantageously, the comparison is followed by a step S9 involving the selection of a snap point adjacent the location point which has been reached and by the step S5, so that the robot comes to rest at a snap point.

According to a further development, in step S6 the speed of the robot 1 can be controlled on the basis of the value of d. The speed can be specified in the control unit 19 as a function of |d|. However, the position into which the control element is brought by the user can, in particular in the case of the input device 12', also correspond to a point in the working space to which the control unit 19 attempts to steer the robot 1. In such a case, the speed of the robot can be independent of |d|; however, it can also be influenced indirectly by |d|, for example via a PID controller.

The step S9 can be identical to the step S4 described above, involving selection of snap points according to the procedure shown in FIGS. 4 and 5, which snap points lie beyond the location point 24 which has just been reached in the direction of the actuation vector d. However, it can be more practical here to define the spatial region which is to be searched for snap points around the location point 24, in particular in the form of a sphere 28 with the location point 24 as the centre point. The radius of such a sphere 28 can be chosen large enough so that, if the snap points lie on a regular lattice, at least one snap point can always be found within such a sphere 28 and can be approached in step S5. However, if the radius is less than the edge length of the lattice, then a situation arises as illustrated in FIG. 6: a location point 24 or 24' at which the robot is located if the end of the actuation is detected in step S8 is not generally a snap point, but lies somewhere between snap points. In the case of the point 24 the distance to the snap point (1,1,0) is less than the radius of the sphere 28; therefore, the snap point (1,1,0) is found in step S9 and approached in step S5, as illustrated by an arrow 22 in FIG. 6. The sphere 28' surrounding the location point 24' does not contain a snap point; therefore, in this case the search for a snap point in step S9 is unsuccessful, and the movement of the robot ends at the point 24'.

In an equivalent manner, as also shown in FIG. 6, snap spaces 25 (in this case also spherical in form) can also be defined around the snap points. If, at the time of the step S8, the robot is located in such a snap space 25, for example at the point 24, then in step S5 it approaches the snap point in the centre of the snap space 25, in FIG. 6 the snap point (1,1,0); otherwise it remains stationary at the point 24' reached in step S8.

According to a further development of the invention, a movement of the robot in the direction indicated through the actuation d can also take place in the case of an actuation |d| below the reaction threshold Th1. This movement is significantly less than the nearest snap point in the direction indicated by the actuation d, but it makes it possible for the user to recognise in which direction the robot would move if they increased the actuation d beyond the reaction threshold Th1, allowing them to correct the direction of the actuation if necessary. If the user discontinues the actuation without exceeding the reaction threshold Th1, then the robot also returns to the starting point.

According to a preferred further development of the method, points passed through during the course of a movement of the robot are recorded. These points can for example be the adjacent snap points determined in step S4 or S9; if a continuous movement is carried out according to the steps S6-S8, points passed through during the course of this movement should also be recorded, in particular those in which a pronounced change in the vector d is detected in step S8. This means that, after the movement of the robot has been carried out once based on the input of the user on the control element 13 or 13', the control unit 19 can reproduce this movement later at any time without the assistance of the user.

In a further development of the invention, the snap points or snap spaces can be made tangible for the user in that the user is provided with a haptic feedback. This feedback can for example be generated with the aid of an input device 12, 12' with a "force feedback function". Such input devices are equipped to cause the manual control element 13 (for example the handle of a joystick) to vibrate. The vibration of the control element 13 thus serves to provide signals to the user. If for example a snap space 25 has been reached, then the force feedback function is activated and causes the control element 13 to vibrate.

In addition to the haptic feedback, in an additional further development of the invention the user can also be provided with optical and/or acoustic feedback if the robot 1 has reached a snap point 17. For example, when setting up robots and multiple-axis machines an acoustic support on passing beyond safety zones can indicate to the user the "urgency" of the snap points. The same applies to forms of visual feedback. For example, the input device can be equipped with a coloured LED which lights up in different colours when different snap points are reached. In this case a red signal light indicates a different urgency than the colour blue or green.

Providing different forms of the haptic, acoustic or optical feedback in different parts of the working space 14, for example a storage area, a safety area or a boundary area, can make it easier for the user to recognise in which of these areas the robot 1 is currently located.

With the method illustrated in FIG. 3, two different modes of movement of the robot 1 can be realised, on the one hand a stepwise movement from one snap point to the next, on the other hand a continuous movement which is not influenced by the snap points as long as the actuation of the control element 13 or 13' is strong enough. However, there are also intermediary modes of movement which combine the features of both modes of movement. Such an intermediary mode of movement can for example be selected by the control unit 19 if Id' lies below the switchover threshold Th2, but above a threshold Th3, where Th1<Th3<Th2.

In a first variant of this intermediary mode of movement, while moving continuously in the direction corresponding to the vector d, as described above with reference to steps S6-S8, the robot 1 moves more slowly in the vicinity of a snap point, for example in one of the snap spaces 25 shown in FIG. 6, than outside of it. The reduced speed makes it easier for the user to approach the snap point in a controlled manner; after he has recognised, on the basis of the reduced speed, that the robot 1 is located in the vicinity of a snap point, he can discontinue actuation of the control element in order to bring about an automatic movement to the snap point through the steps S9, S5.

In a second variant of the intermediary mode of movement the robot 1 automatically performs a continuing movement when it reaches a snap space 25. FIG. 7 shows the reference point 31 at the tip of the end effector 9 on a path section B shortly before reaching a snap space 25 which surrounds a snap point 17. On entering the snap space 25 the reference point 31 deviates from the direction of movement defined by the vector d and moves towards the snap point 17. If, on reaching the snap point 17, the user has not discontinued actuation of the control element, that is to say the snap point 17 was clearly not the target of the movement guided by the user, then the reference point 31 returns to its original course and leaves the snap space 25 on a path section B' in an extension in a straight line of the path section B.

Different paths of the reference point 31 are possible within the snap space 25. The path drawn as a continuous line runs radially between the margin of the snap space 25 and the snap point 17. Examples of alternative paths are drawn in as dotted lines. These different forms of movement within a snap space can also be specific for different areas of the working space 14, so that the user can recognise from them in which of the areas the robot is located.

For example, all snap points 17 which are located on the margin of the working area 14 trigger a peak-like path (see FIG. 7). Since the working space 14 is invisible for the user, this makes it possible to signal to the user, in a simple way, that he has moved the reference point 31 to the boundary of the working area 14.

Accordingly, the paths with different forms, for example a wave-like path (see FIG. 7), can be assigned different information. For example, it can be indicated whether a snap point has been repeatedly approached, whether the user has deviated from a movement path and the reference point 31 is moving off the movement path, whether snap points or working points are being approached by other robots or machine elements, whether the reference point 31 has penetrated into a particular partial region of a working area, for example a storage area, a safety area or a boundary area, or has passed from one partial region into another partial region.

REFERENCE NUMBERS 1 robot
2 arm element
3 arm element
4 base element
5 articulated joint
6 articulated joint
7 articulated joint
8 instrument
9 end effector
10 articulated joint
11 instrument axis
12 input device
12' input device
13 control element
13' control element
14 working space
15 longitudinal axis
16 location point
17 snap point
18 distance
19 control
22 arrow
23 cone
24 location point
25 snap space
26 lattice
27 sphere
28 sphere

The invention claimed is:

1. A method for controlling a robot arm (1) utilizing a manually operable user activated robot arm motion director (13) coupled to a robot arm motion controller (19), said robot arm motion controller (19) responsive to said manually operable user activated robot arm motion director (13), for monitoring a position of said user activated robot arm motion director (13) and responsive to said monitored position of said manually operable user activated robot arm motion director (13), for controlling the movement of said robot arm (1), said method comprising the steps of:
 a) defining, in said robot arm motion controller (19), a working space (14) comprising a predetermined physical range of said robot arm (1);
 b) defining, in said robot arm motion controller (19), at least one snap point (17) within said working space (14) of said robot arm (1), said at least one snap point (17) comprising at least one predefined point within said working space (14) which can be reached by a reference point (31) on the robot arm (1);
 c) detecting the magnitude (|d|) of a manual actuation of said manually operable user activated robot arm motion director (13) (S1) by said robot arm motion controller (19), and wherein a vectorial value (d) is measured and the measured vectorial value of the vector is taken as the detected magnitude (|d|) of the actuation, wherein the vectorial value (d) is one of a deflection of the user activated robot arm motion director (13, 13') from an idle position or of a force exerted on the user activated robot arm motion director (13, 13'); and
 d) if the detected magnitude (|d|) of the manual actuation (d) of said manually operable user activated robot arm motion director (13) lies below a switchover threshold (Th2) (S3), said robot arm motion controller (19) is configured for determining a snap point (17) which is adjacent a current location point of the reference point (31) on the robot arm and for then moving the reference point on the robot arm (31) to a snap point (17) adjacent said current location point (S5), and wherein the movement of the reference point on the robot arm (31) is halted at least temporarily on reaching the adjacent snap point (17) by said robot arm motion controller (19), or alternatively
 e) if the detected magnitude (|d|) of the actuation lies above the switchover threshold (Th2), said robot arm motion controller (19) is configured for continuously moving the reference point (31) (S6-S8).

2. The method according to claim 1, wherein steps d) and e) are only carried out if the detected magnitude (|d|) of the actuation lies above a reaction threshold (Th1).

3. The method according to claim 1, wherein in steps d) and e), the reference point on the robot arm (31) is moved in a spatial direction assigned to a direction of the vectorial value (d).

4. The method according to claim 1, in which in step e), the reference point on the robot arm (31) is moved more quickly the greater the detected magnitude (|d|) of the actuation.

5. The method according to claim 1, characterized in that if an actuation ends and the reference point on the robot arm (31) is not located at a snap point (17), the reference point on the robot arm (31) is moved to an adjacent snap point (17).

6. The method according to claim 5, wherein the end of an actuation is detected if the magnitude (|d|) of the actuation falls below the switchover threshold (Th2).

7. The method according to claim 2, wherein the end of an actuation is detected by said robot arm motion controller (19) if the magnitude (|d|) of the actuation falls below the reaction threshold (Th1).

8. The method according to claim 1, wherein in step b), said robot arm motion controller (19) defines points of a periodic lattice (26) as said snap points (17).

9. The method according to claim 1, wherein in at least one part of the working space (14), a periodic lattice of cells ($K_{(x,y,z)}$) is defined by said robot arm controller (19), and wherein each of said periodic lattice of cells ($K_{(x,y,z)}$) contains an identical arrangement of one or more snap points (17), advantageously at the corners of each said periodic lattice of cells ($K_{(x,y,z)}$).

10. The method according to claim 1, wherein the robot (1) is configured to carry out at least one activity at a location point, and a location point at which the activity has been carried out is defined as a snap point (17).

11. The method according to claim 1, in which the movements of the reference point on the robot arm (31) are recorded by said robot arm motion controller (19).

12. The method according to claim 1, characterized in that said robot arm motion controller (19) seeks an adjacent snap point (17) in a spatial region (28, 28') centered around a current reference point (31) location point (24, 24').

13. The method according to claim 1, characterized in that said robot arm motion controller (19) seeks an adjacent snap point in a spatial region (23, 27) on a margin of which the current reference point (31) location point (24, (0,0,0)) is located.

14. The method according to claim 13, characterized in that the spatial region (27) extends beyond the current location point (24, (0,0,0)) in the direction of an immediately preceding movement of said reference point (31).

15. The method according to claim 12, characterized in that the movement of the reference point on the robot arm (31) to the adjacent snap point does not take place if the spatial region (28') does not contain a snap point.

16. The method of claim 1 further including providing a computer program product which includes instructions which, when run on a computer provided as part of said robot control arm motion controller (19), enables said computer to carry out the method.

* * * * *